United States Patent [19]
Yamamoto

[11] 3,812,971
[45] May 28, 1974

[54] AN APPARATUS FOR DEHYDRATING A SLURRY

[76] Inventor: Samuro Yamamoto, Akasaka 6-2-13-506, Minato-ku, Tokyo, Japan

[22] Filed: Dec. 27, 1971

[21] Appl. No.: 211,930

[30] Foreign Application Priority Data
Dec. 28, 1970  Japan.............................. 45-120085
Dec. 29, 1970  Japan.............................. 45-120775
Sept. 6, 1971  Japan.............................. 46-68676

[52] U.S. Cl.................. 210/327, 100/159, 210/386, 210/397, 210/401
[51] Int. Cl............................................ B01d 33/04
[58] Field of Search....... 210/67, 77, 386, 391, 396, 210/397, 400, 401, 327, 329, 330, 334; 100/118-121, 151, 159; 162/203, 301, 303

[56] References Cited

UNITED STATES PATENTS

| | | | |
|---|---|---|---|
| 3,176,607 | 4/1965 | Lapham.......................... | 210/329 X |
| 3,315,370 | 4/1967 | Hikosaka........................ | 100/118 X |
| 3,578,559 | 5/1971 | Beck............................... | 162/203 X |
| 3,613,564 | 10/1971 | Adamski......................... | 210/386 X |
| 3,703,963 | 11/1972 | Eguchi et al..................... | 210/386 |

Primary Examiner—John Adee
Assistant Examiner—Robert H. Spitzer
Attorney, Agent, or Firm—Eric H. Waters

[57] ABSTRACT

An apparatus for concentration of dilute solid-liquid slurry by passing through a filter-squeeze out vessel which comprises units formed of a vertical endless-filter belt stretched upon a pair of driving rolls extending across the vessel, these units of the endless-filter belt and driving rolls being set in parallel in the vessel with a definite space in between, the endless-filter belts rotating continuously or periodically; filtering the slurry and the draining filtrate from inside of the filter media to the outside of the vessel. Squeezing rolls and driving rolls are set so as to be tightly contacted to form a separating wall on the open side of the vessel. The layer of solids upon the filter surface are squeezed out, and scraped to the outside of the separating wall as a squeezed out cake.

To make the device more effective the filter-squeeze out vessel is assembled with a press device comprising primary and secondary perforated cylinders and a press roll which is wrapped with endless-filter sheet and endless-press sheet. Each cylinder and press roll is arranged in the position so as to form a gradually approaching S-shaped-path, wherein the squeezed out cake is induced and pressed out to obtain the highly concentrated cake in one process step.

2 Claims, 9 Drawing Figures

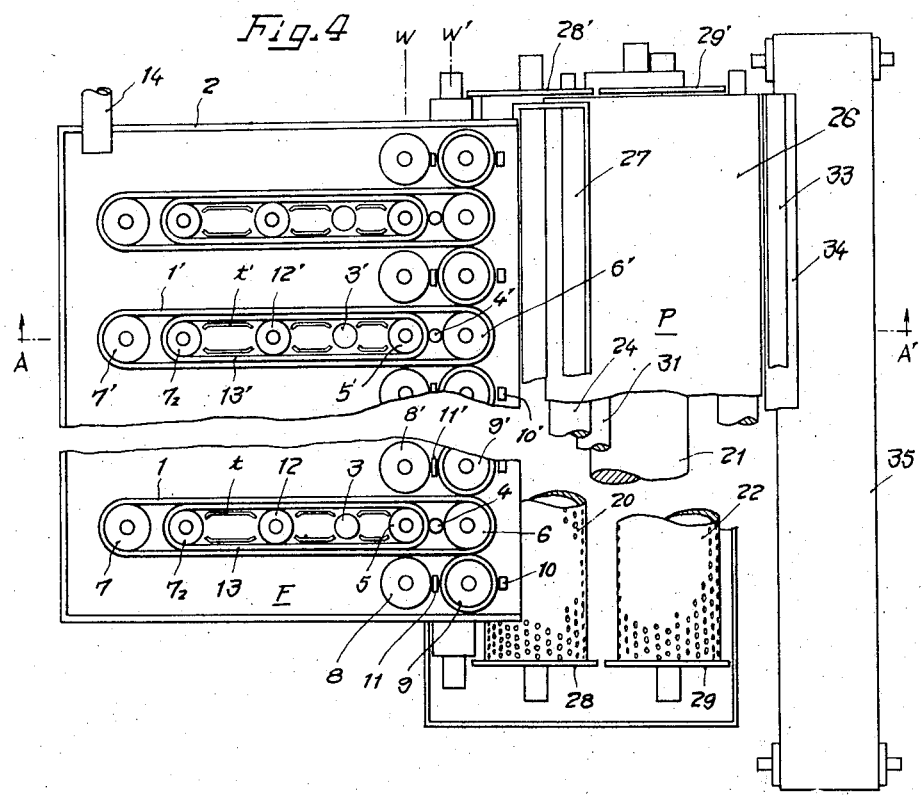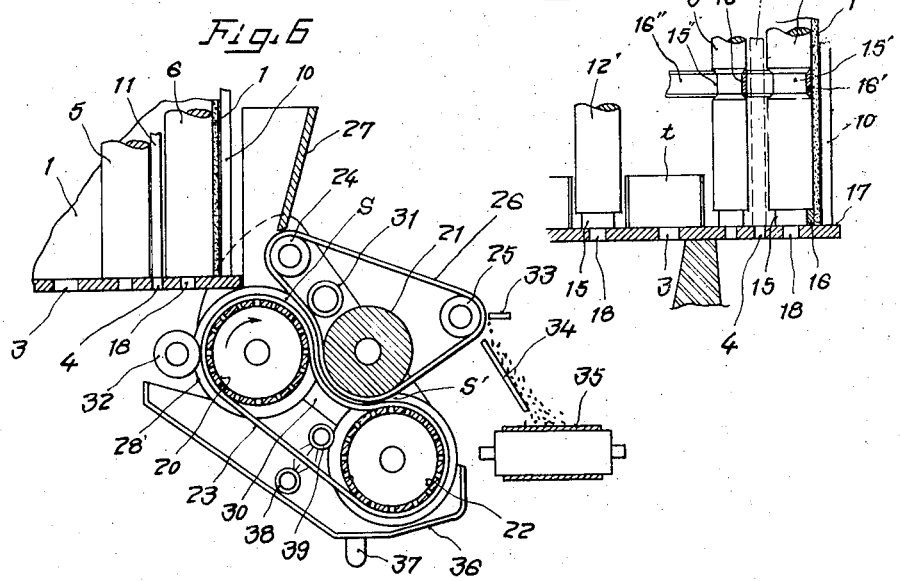

AN APPARATUS FOR DEHYDRATING A SLURRY

BACKGROUND OF THE INVENTION

1. Field of invention

This invention relates to an apparatus for concentration of solid-liquid slurry such as waste or sewage sludge, minute fibers and metallic hydroxide etc., (hereafter these are called "slurry") which are obtained by ordinary settling tanks or aerated separation devices. In this invention the slurry is dehydrated with high efficiency by a filter-squeeze out vessel and assembled press device in one process step, whereby this treatment of slurry especially is adapted to prevent polution and provide for utilization of recovered substances.

2. Description of prior art

It has long been known that waste water may be treated by settling tanks or aerated separation devices discharging the greater part of liquid as the supernatant liquid, and taking out a slurry which contains separable minute substances. The slurry is then introduced to thickening devices such as a sedimentation thickening tank or many kinds of cyclical thickener so as to obtain 4 – 5% of solid (here in the case of paper mill's waste), the thickened slurry is obtained from above and introduced to further dehydrating devices, such as belt-filters, filter presses and centrifuges having to use the vacuum, high pressure and centrifugal force, then to obtain about 20% or near content of solid.

Therefore, ordinary processes have many problems which must be solved. These concentrating processes are complex, and need large scaled apparatus, require a large equipment area and great expenditure.

SUMMARY OF THE INVENTION

This invention solves the problem set forth above in that a. through the filter-squeeze out vessel, the slurry which is separated from ordinary settling tanks or aerated separation devices even though as dilute as 0.3 – 1.0% content of solid, can be introduced directly to the outside of the endless-filter belts and filtered (without the use of thickening devices such as thickening tanks or cyclical thickener) by use of squeezing rolls, so as to make it possible to obtain a squeezed out cake which has a solid content of 10 – 14%. The squeezed out cake is fed into the present press device and pressed by S-shaped-path of sheets, forms a pressed cake which has a solids content of 18 – 20% or more.

b. the process of the present invention is simple so that it does not use high pressure or vacuum, nor a thickener at any step in the process. It does not need large scale apparatus while, the base area of the present apparatus is very small and the height thereof low. Accordingly, the cost of the apparatus is greatly reduced and by practise of this invention enables use of the facilities for extensively preventing pollution.

BRIEF DESCRIPTION OF THE DRAWINGS

FIG. 4 is a plan view of a filter-squeeze-out-vessel and press device in which the devices according to the present invention have been installed.

FIG. 5 is a section taken on line A–A' of FIG. 4.

FIG. 6 is a section taken on line A–A' of FIG. 4.

DETAILED DESCRIPTION OF THE PREFERRED EMBODIMENTS

EXAMPLE I

Figure 1:
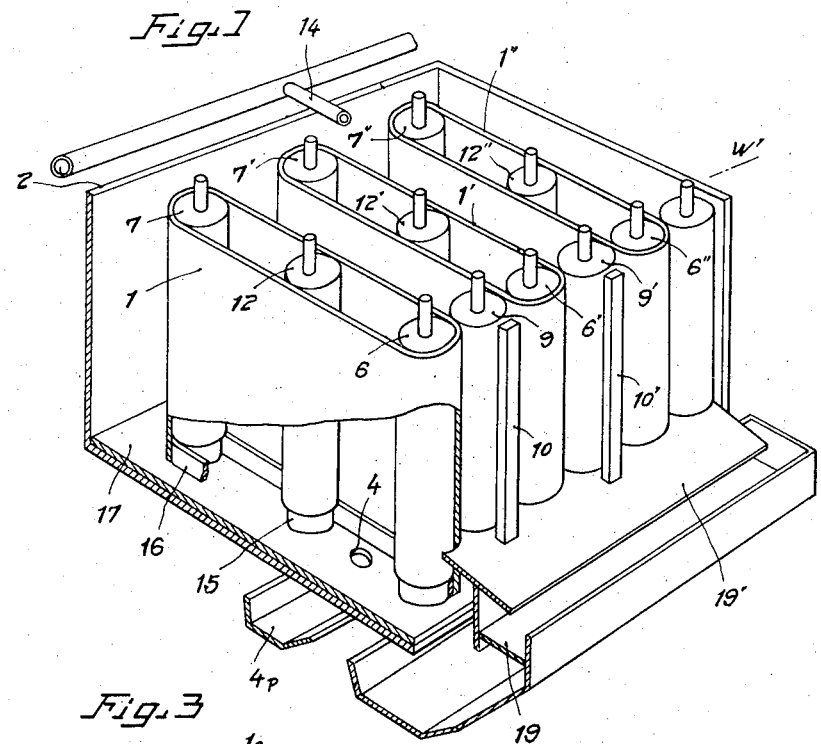
FIG. 1 is a perspective view of a filter-squeeze-out-vessel constructed according to the present invention.

Referring to FIG. 1, FIG. 4 and FIG. 5 illustrated at 1,1' are the endless-filter-belts which are set in parallel with a predetermined space therebetween in the vessel 2. The endless-filter belts 1,1' are rotated for filtering (it being noted that endless-filter-belts can be stopped, if necessary, wherein filtering can be performed), and filtrate is accumulated at the inner side of filter media, passing through drain holes 3,4,3',4' to the outside of the vessel 2, and drained off through filtrate-conduit 4P. Driving rolls 5,6,5',6' are set at the open side of the vessel 2, and counter driving rolls 7,7' are set at the opposite side of the vessel, the endless-filter-belts 1,1' being stretched upon the driving rolls 6,6' and counter driving rolls 7,7' and internal-endless-perforated-belts 13,13' being are stretched upon the driving rolls 5,7$_2$, 5',7$_2$. Driving rolls 5,6,5',6' are set at the open side of the vessel 2, and squeezing rolls 8,9,8',9' are tightly contacted face to face with driving rolls 5,6,5',6' while endless-filter-belts 1,1' are set between each of the driving rolls 5,6,5',6' and squeezing rolls 8,9,8',9', so that they form separating walls W,W' on the open side of the vessel 2. A filter membrane which is formed upon the surface of filter media of endless-filter-belts 1,1', is squeezed outwardly of the separating wall W,W', scraped off by scrapers 10,10' and is then carried out. Furthermore, the internal-endless-perforated-belts 13,13' are set in doubly at the inner side of each endless-filter-belts 1,1' which can then rotatably align themselves therewith, so as to strengthen against the outer liquid pressure. Further more, 11,11' are inner separators which prevent the solid squeezed at first from going backward, 12,12' are intermediate rolls which, if necessary may be attached, while t,t' are support plates which can be heightened further to support the upper part of endless-filter-belt. Designated by 14 is the inlet tube of original slurry, 15 is the cut-in-end of the driving rolls 5,6,5',6', intermediate rolls 12,12' and counter driving rolls 7,7', 16 is an edge belt which is interfits with the cut-in-end, while 15 prevents detachment of endless-filter-belt from the wall surface 17 of the vessel 2, so to prevent original slurry leakage, 18 is the axis part of driving rolls 6,12' etc., 19 is a trough conveyor, 19' is a gliding plate for the cake. In the above explained apparatus the endless-filter-belt 1,1' may be set to rotate in a vertical direction, rather than always rotating in a horizontal direction.

Figure 3:
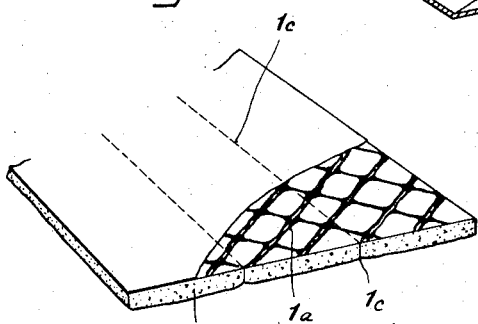
FIG. 3 is an enlarged perspective view of FIG. 2.
Figure 2:
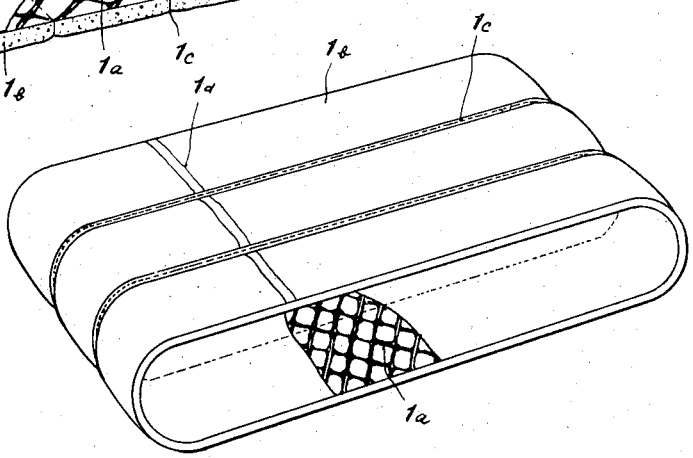
FIG. 2 is a perspective view of an endless-filter-belt.

Referring to FIGS. 2 and 3, the endless-filter-belts 1,1' are made of a filter belt structure 1b such as a foamed body of plastics, non-woven cloth, felt and filter cloth, and lined with stretchless-flexible-perforated-plate or cloth 1a, then stitched together 1c along the longer side of the filter belt 1b to form a belt body, while both ends of filter belt 1b are seamed together 1d to form endless-filter-belts 1,1'. Incidentally the scrapers 10,10' are attached to the surface of the endless-filter-belts in the vessel, also controlling the exhaust canals or holes which can thereby timely open and close so as to discharge outside the thickened slurry. In this case, squeezing rolls 8,9,8',9' are not necessary, but an ordinary wall is required instead of separating wall w,w'.

EXAMPLE II

Figure 7:
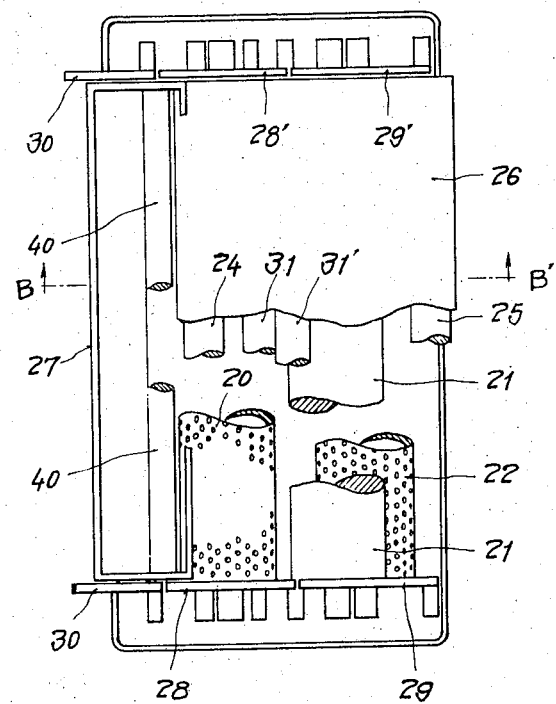
FIG. 7 is a plan view of a press device.
Figure 8:
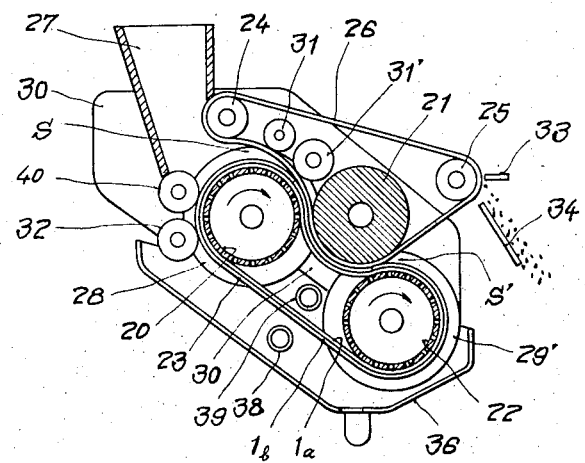
FIG. 8 is a section taken on line B–B' of FIG. 7.

Referring to FIG. 7 and FIG. 8, the squeezed out cake obtained from the apparatus as above explained in practical illustration 1 is introduced to the following device:

Primary-perforated-cylinder 20 and press roll 21 are set in parallel, with horizontally extending, secondary-perforated-cylinder 22 being positioned under the press roll 21, primary and secondary perforated-cylinders 20,22 are wrapped with endless-filter-sheet 23, while press roll 21 and guide rolls 24,25 are wrapped with endless-press-sheet 26. The perforated-cylinders and press-rolls 20,21,22 are arranged in a position so as to form a gradually approaching S-shaped-path S–S', in which the squeezed cake from the apparatus is fed into and pressed out.

Furthermore, thrust collars 28,28',29,29' and seal plate 30 may be set at both ends of the primary and secondary perforated-cylinders 20,22 so as to fit in both ends of each of the press roll 21 endless-filter-belt 23, endless-press-sheet 26 and the hopper 27 so as to form a seal preventing leakage of pressed materials. Also, in these drawings, 38,39 are shower pipes of the endless-filter-belt 23, and 32 is a squeezing roll for the endless-filter-belt 23; 31,31' are sub-press-rolls, 33 is scraper, 34 is chute, 40 is a bottom roll of the hopper 27. In the example 2, the vacuum can be applied to the primary and secondary perforated-cylinder, if necessary.

EXAMPLE III

Figure 9:
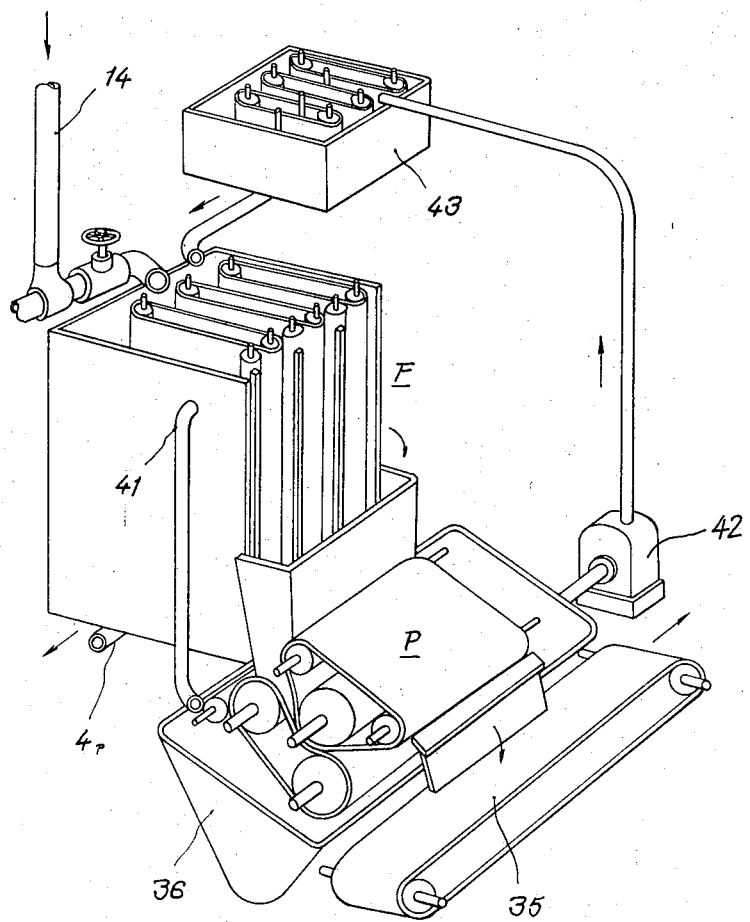
FIG. 9 is a perspective view of an apparatus for concentration of a solid-liquid slurry in which the devices of the present invention have been installed.

Referring to FIG. 4, FIG. 5, and FIG. 9 the rotating endless-filter-belts 1,1' are erected in parallel in the vessel 2, with a predetermined space therebetween, original slurry being fed into the vessel 2 through the inlet tube 14. The slurry is filtered by the endless-filter-belt 1,1' whereby filtrate is accumulated at the inner side of filter media passing through drain holes 3,4,3',4' to the outside of the vessel 2, and squeezing rolls 8,9,8',9' are tightly contacted face to face with driving rolls 5,6,5',6' by each other, while endless-filter-belts 1,1' are set between both of the driving rolls 5,6,5',6' and squeezing rolls 8,9,8',9', so that they form a separating wall w,w' on the open side of the vessel 2. A filter membrane which is formed upon the surface of filter media of endless-filter-belt 1,1' is squeezed outwardly of separating wall w by the squeezing rolls 8,8', with the inner separator 11,11' preventing the solid at first to go backward, and the squeezing rolls 9,9' effecting squeezing again toward the outside of separating wall w', with squeezed out cake being scraped by scrapers 10,10'. Hereby, the above described apparatus is designated as a "filter-squeeze-out-vessel F".

In connection with this filter-squeeze-out-vessel F, press device P is set so that primary-perforated-cylinder 20 and the press roll 21 are set in parallel horizontally, secondary-perforated-cylinder 22 being located under the press-roll, primary and secondary perforated-cylinders 20,22 being wrapped with endless-filter-sheet 23, while press roll 21 and guide rolls 24,25 are wrapped with endless-press-sheet 26, each perforated-cylinders 20,22 and press-roll 21 being arranged in the position so as to form a gradually approaching S-shaped-path wherein those of the squeezed cakes from the filter-squeeze-out-vessel F passing through hopper 27 are fed into and pressed out so that the press treatment is performed much more efficiently. Thrust-collars 28,28',29,29' and seal plate 30 may be set at both ends of the primary and secondary perforated-cylinders 20,22 so as to fit in the both ends of the following such parts as press-roll 21, endless-filter-sheet 23, endless-press-sheet 26, and hopper 27. By this structure, both sides of these can be sealed up preventing leakage of pressed materials. If the press belt consists of smooth surfaced plastics plates, pressing and scraping becomes easy. In the drawing, 31 is the sub-press-roll, 32 is a squeezing roll for the endless-filter-sheet 23; 33 is a scraper, 34 is a chute, 35 is a conveyor, 36 is a drainage pan, 37 is an outlet pipe, 38,39 are shower pipes for the filter belt 23, 41 is an overflow tube, 42 is a the pump, and 43 is a recover-thickening device.

Incidentally, referring to FIG. 4, according to the type (as, in the case when comparatively long fibers are contained) of original slurry, driving rolls 5, and inner separator 11 and the squeezing-roll 8 and drain hole 4 can be omitted, as shown in FIG. 1, while only by using the separating wall w' formed with driving rolls 6,6' and squeezing-rolls 9,9', squeeze out can be performed. In addition, based on the necessity of increasing the dehydrating degree, the press device P may be set in doubly.

In both cases as practically illustrated in 1 and 3, filtering efficiency can be increased through repeated operations by which original slurry is fed into the vessel for some definite periods when rotation of endless-filter-belts and squeezing-rolls are stopped, hereafter, stopping the inlet of the slurry, rotating both of the driving rolls and squeezing-rolls to squeeze out the cake outside.

In this invention, the function of the filter-squeeze-out-vessel is as follows:

To explain taking example of paper mill's waste, in case of the waste liquid passing through the ordinary settling tank or aerated separation device they discharge very dilute slurry (for example 99.5 – 99% of water), yet it is possible to treat this dilute slurry by the present filter-squeeze-out-vessel, the slurry in the outside of endless-filter belt being of course dilute, but the solid percent of membrane which is formed upon the surface of filter media is to be 6 – 8% while the time of forming of the membrane is as short as 5 to 10 minutes, this fact having now been discovered whereby, if the endless-filter belts are provided in the vessel set horizontally and squeezing the said membrane only to the outside, squeezed out cake will become more thickened, and also, if the endless-filter belts are set in parallel in the vessel the filter area will be widely increased considering the apparatus area, in view of which this filter-squeeze-out-vessel has been devised, whereby when in practice, the result of squeeze out cake's content leads to 10 – 14% of solid. This percentage of solid far exceeds the ordinary thickening limit of 4 to 5%, and this dehydrating ation is not "thickening" but filtration and continuous squeezing of filter membrane, whereby the efficiency of filtration becomes very high due to early renewal of the filter surface by the continuous discharge of filter solid layer. Moreover, the filter solid layer is scraped off while it is thin, taking only the filter membrane without liquid, and the outer pressure of the filter media is not high because filter pressure follows the outer liquid head only as explained before and the filter membrane is not so compressed as in the case of high pressure or vacuum, consequently, as a result of these functions the filtration efficiency becomes very high.

Another important element of this invention is the press device, wherein the squeeze out cake from the said squeeze-out-vessel is fed into between endless-filter-sheet and endless-press-sheet so as to pass through gradually approaching S-shaped-path to be pressed. The separate drainage goes through the primary and secondary cylinder's perforated holes and also each cylinder's intermediate gap is drained to the outside. The S-shaped-path serves to prevent press-cake from pushing back in the opposite direction by the pressure of rolls which would decrease press efficiency. While endless-filter-sheet and endless-press-sheet pass through together with the intermediate gap $b$, which is formed by each of the cylinders and rolls arranged in the position and by a projection in the face of press roll, both filter-sheets are still maintained in stress condition so that during passing through this gap $b$ dehydration effectively continues and by this stress, when the cake receives final pressing by the press roll and secondary-perforated-cylinder, it is possible to increase dehydrate in degrees.

Compared with the present invention, the ordinary type of dehydrating apparatus has the endless-filter belt symmetrically located between the upper and lower press rolls. As soon as the belt passes through the press roll, filter media swells out and reabsorbs the separating liquid in the filter media whereby the separation of liquids from solid is poor, and consequently needs many press rolls and longer filter belt, yet fails to increase in solids content.

In the present invention, although the filter-squeeze-out-vessel and the press device can be used as an independent dehydrating device, herein the filter-squeeze-out-vessel and press device are jointly connected so as to achieve rapid and accurate dehydration with a smaller apparatus space.

The pressed materials obtained in this way may be left piled up for natural drying and also can crumble easily into small pieces for ready drying and burning, or used as other industrial materials.

What is claimed is:

1. In an apparatus for dehydrating a slurry comprising at least one pair of endless, parallel, spaced apart filter belts, each of said belts passing around a driving roll and a counter-driving roll which are vertically arranged and spaced apart from each other within a vessel, and means for driving said roll; the improvement comprising a squeezing roll disposed between, and in contact with, the driving roll of one filter belt and the driving roll of the other filter belt; a scraper positioned in contact with said squeezing roll; and outlet apertures provided at the bottom of said vessel within the region enclosed by each of said filter belts for discharging the filtrate therefrom.

2. An apparatus according to claim 1, each said roll having an end portion of reduced cross section receiving an edge belt restraining each filter belt from running off the bottom surface of the vessel to thereby prevent the surrounding slurry from mixing with the filtrate within the region enclosed by each filter belt.

* * * * *